United States Patent [19]

Zacharias, Jr.

[11] 4,417,480
[45] Nov. 29, 1983

[54] DAMPENED ULTRASONIC TRANSDUCER

[75] Inventor: Ellis M. Zacharias, Jr., Tulsa, Okla.

[73] Assignee: Mapco, Inc., Tulsa, Okla.

[21] Appl. No.: 269,647

[22] Filed: Jun. 2, 1981

[51] Int. Cl.³ .................................................. G01F 1/66
[52] U.S. Cl. .............................. 73/861.18; 73/861.27; 310/327
[58] Field of Search ............... 73/632, 861.18, 861.27, 73/861.28; 310/326, 327, 334, 336

[56] References Cited

U.S. PATENT DOCUMENTS

| 3,771,117 | 11/1973 | Shaffer et al. | 73/861.27 X |
| 3,890,423 | 6/1975 | Zacharias, Jr. | 310/327 X |
| 3,935,484 | 1/1976 | Leschek et al. | 310/327 |
| 4,240,004 | 12/1980 | Coleman | 310/327 |

FOREIGN PATENT DOCUMENTS 2150630  4/1973  France ............................ 73/861.18

Primary Examiner—Charles A. Ruehl
Attorney, Agent, or Firm—Head, Johnson & Stevenson

[57] ABSTRACT

An improved dampened ultrasonic transducer for imparting sonic energy to or receiving sonic energy from fluid, having a housing with a cylindrical cavity therein providing a closed end wall at one end and an opening in the opposite end, the housing having internal threads adjacent the opening. A piezoelectric crystal is positioned within the housing, the front face being contiguous to the cavity closed end wall, a cylindrical dampening member positioned within the cavity with the front face contiguous to the crystal rear face, a plurality of spring washers, the forwardmost washer engaging the rearward face of the dampener member, and an externally threaded plug member positioned in the rearward end of the housing and threadably advanced to apply compressive resilient force against the dampening member to maintain firm contact of the dampening member with the crystal and the crystal with the housing closed end wall.

5 Claims, 4 Drawing Figures

DAMPENED ULTRASONIC TRANSDUCER

BACKGROUND OF THE INVENTION

1. Field of the Invention

This invention relates to ultrasonic transducers of the type employed in ultrasonic flowmeters.

2. The Prior Art

Transducers of this type employ one or more piezoelectric elements. When used in the pulse mode the piezoelectric element is excited by short duration voltage pulses, typically one or two microseconds in duration. Upon application of a voltage pulse a piezoelectric element undergoes dimensional changes. These dimensional changes produce acoustic pressure waves in the contiguous medium, and this acoustic wave is utilized in ultrasonic flowmeters to gauge the speed of fluid flow within the meter.

When a piezoelectric element is excited by a short duration voltage pulse the dimensional changes which the element undergoes should ideally disappear as soon as the voltage pulse is removed. However, piezoelectric elements have elastic properties. The elements therefore oscillate in a dampened sinusoidal manner following excitation.

To dampen the oscillations in a piezoelectric element, it is a known practice to secure to the rearward face of the element a dampening member. The members are formed of material which dissipates energy and prevents acoustic energy from being reflected back from the element into the crystal. It has been a common practice to bond the dampening element to the rearward face of a piezoelectric crystal utilizing cement. This method of bonding is usually suitable for temperatures over a range of approximately 0° to 100° C. However, at cryogenic temperatures, such as that of liquid nitrogen (−196° C.), the difference in thermal expansion of the piezoelectric element and the dampening member may cause the cement bond to fail. If this bond fails, then dampening provided by the dampening element is substantially removed. When dampening is lost the ultrasonic device may itself fail.

This invention overcomes the problems of the prior art by providing a compact transducer including a piezoelectric crystal and a dampening member and providing means of securely maintaining the dampening member in contact with the piezoelectric element even at cryogenic temperatures.

SUMMARY OF THE INVENTION

An improved dampened ultrasonic transducer useable at cryogenic temperatures is provided. The transducer includes a housing having a cylindrical cavity therein. The forward end of the housing provides an end wall, and the rearward end of the housing is open and includes internal threads adjacent the open end. Positioned in the housing is a piezoelectric crystal of cylindrical dimensions slightly less than the internal diameter of the housing cavity and of short axial length. The crystal has as front and rear face, the front face being contiguous to the housing end wall. A conductor is secured to the crystal rear face, preferably at or adjacent to the center of the rear face. This is typically accomplished by silver solder. A cylindrical dampening member of external diameter the same as that of the crystal and slightly less than the internal diameter of the housing cavity is positioned within the housing. The dampening member forward face is in engagement with the crystal rearward face. The dampening member has a small opening therethrough receiving the conductor extending from the piezoelectric crystal. In a preferred arrangement the dampening member forward face is bonded to the piezoelectric crystal rearward face by use of a cement. The function of the dampening member is to absorb and dampen the sonic energy from the crystal and to prevent the reflection of sonic energy back to the crystal.

Positioned against the rearward face of the dampening member is a plurality of spring washers which may be of the Belleville or wave spring type. When wave spring type washers are employed they are interspersed with flat washers. The conductor from the piezoelectric crystal extends through the center of the spring washers. Closing the housing is an externally threaded plug which engages the spring washers. The plug is threadably positioned within the housing to compress the spring washers and apply a resilient pressure of preselected force, typically several hundred or more pounds per square inch against the dampening member to thereby maintain the dampening member in contact with the piezoelectric crystal. The plug has an axial opening therethrough which receives the conductor extending from the piezoelectric crystal so that the conductor extends externally of the housing. The spring washers provide means of ensuring vibrational transmission contact between the crystal and the dampening member even at cryogenic temperatures which would normally result in the possibility of cement bonding between the crystal and the dampening member failing. The transducer element thus provided achieves improved performance and dependability through a wide range of temperatures of from 100° C.+ down to cryogenic temperatures.

DETAILED DESCRIPTION

Figure 1:
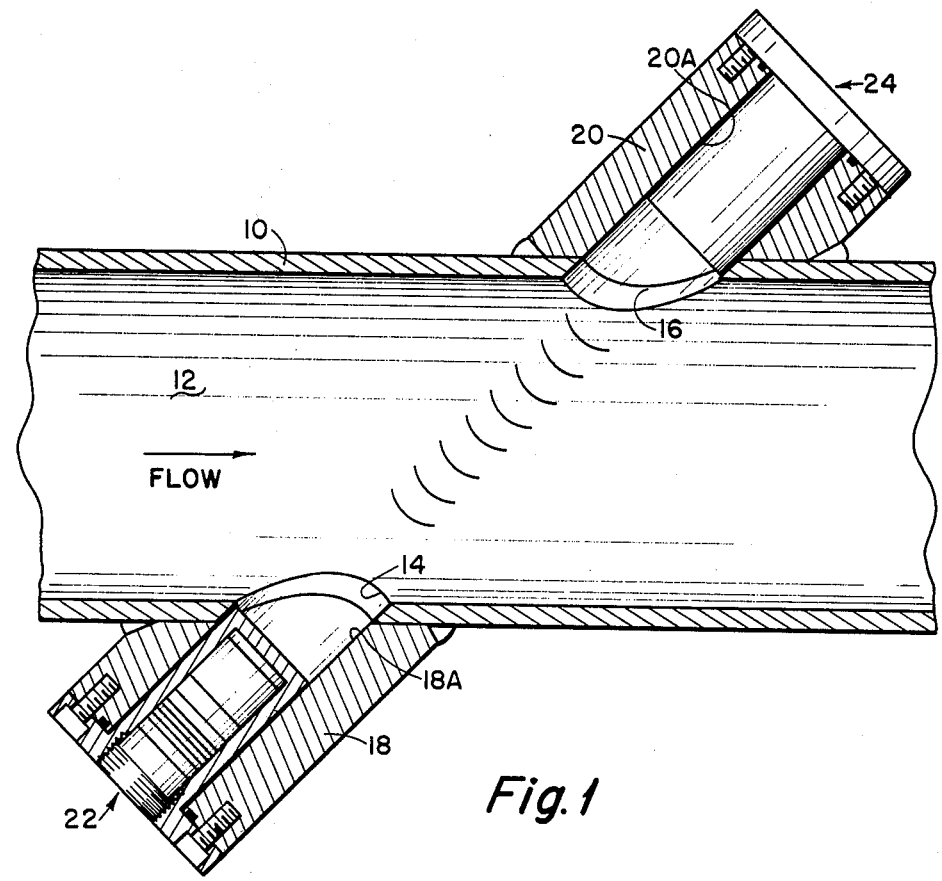
FIG. 1 is a cross-sectional view of one type of ultrasonic flowmeter showing the use of two transducers spaced diagonally across opposite sides of the pipeline illustrating one environment in which the improved dampened transducer of this invention may be employed. The transducer element at the top of FIG. 1 is shown in external elevation while that at the bottom of FIG. 1 is shown in cross-section.
Figure 2:
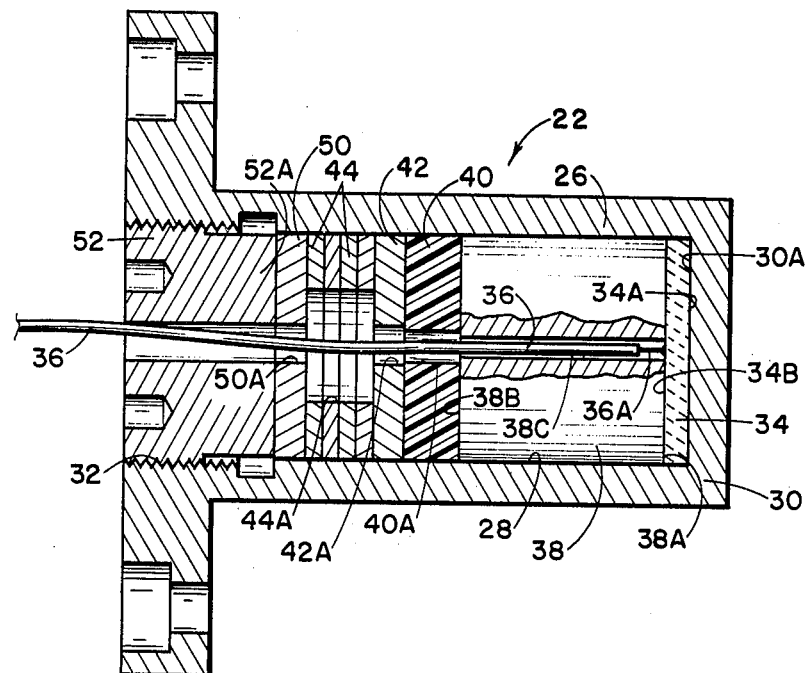
FIG. 2 is an enlarged cross-sectional view of a preferred embodiment of a transducer employing the principles of this invention.

Referring first to FIG. 1, an example of one embodiment of an ultrasonic flowmeter is illustrated as an indication of the type of apparatus to which the present invention is directed. A flow line 10 has fluid 12 flowing through it. The sonic flow meter provides a means of measuring the rate of fluid flow by determining the fluid flow velocity utilizing sound waves. For this purpose, openings 14 and 16 are formed in pipe 10. Meter housing portions 18 and 20 are welded to the exterior of pipe 10, each of the housing portions having a tubular opening 18A and 20A respectively. Positioned in housing opening 18A is a transducer generally indicated by the numeral 22, shown in cross-section and in housing 20 there is a transducer indicated generally by the numeral 24, shown in external elevation. Sonic energy is transmitted between the transducers 22 and 24, either in the direction of or against the direction of flow of fluid 12 through pipe 10. By circuitry means which is not illustrated here but which is well known in the art, the initiation and reception of sonic energy can be accurately measured by which the fluid flow velocity is determined. By multiplying the velocity times the cross-sectional area of pipe 10, the volume flow rate is determined. The apparatus described up to this point is exemplary of one embodiment of an ultrasonic flowmeter, there being many other embodiments. The present invention is directed towards improvements in transducers 22 and 24. For more details of the construction of a preferred embodiment of a transducer, please refer to FIG. 2.

The transducer includes a housing 26 which is of metal and which has an internal cylindrical cavity 28 therein. The housing provides a closed end wall 30 having an interior surface 30A. The other end of the cylindrical cavity 28 is open and the housing has internal threads 32 adjacent the open end. The internal diameter of the threaded portion 32 is slightly larger than the other portion of the cylindrical cavity 28.

Positioned within cavity 28 is a piezoelectric crystal 34 which has a cylindrical diameter slightly less than the internal diameter of cavity 28. Crystal 34 has a front face 34A and a rear face 34B, and is positioned so that the front face 34 is not contiguous with the housing end wall interior surface 30A.

The conductor portion 36A of an insulated conductor 36 is attached to the crystal rear face 34B. Conductor 36 extends exteriorly of the rearward end of the transducer housing.

Positioned within the housing cavity 28 is a cylindrical dampening member 38, having a forward face 38A and a rear face 38B. The external diameter of the dampening member is slightly less than the internal diameter of cavity 28. The forward face 38A of the dampening member is in contact with the rearward face 34B of the crystal. For proper operation of the transducer, this contact must be absolutely secure. For this purpose, in the preferred arrangement, a cement is applied between the surfaces 34B and 38A so as to bond the crystal to the dampening member. As previously stated, bonding a crystal to a dampening member is a known technique, and this functions satisfactorily in most instances; but wherein the transducer 22 is subject to a wide temperature variation, such as when it is used in cryogenic applications, the dimensional changes which take place due to temperature changes sometimes causes the cemented juncture to fail. This invention provides means of reducing the possibility of such failure or if such failure occurs, to compensate and overcome the failure. Therefore, it is not mandatory that a cement be employed between the crystal and the dampening member, but the use of cement to join these members is preferred, even though as will be subsequently pointed out, the construction of the transducer ensures a positive contact over the entire surface area between the dampening member and the crystal to prevent failure of the transducer.

The dampening member 38 may be provided with a small diameter axial opening 38C to receive conductor 36A as illustrated or, in another arrangement, the conductor 38A is coated with a substance which will not stick to the material of which the dampening material is formed. The dampening member may then be cast in the desired form with conductor 36 in place. The coating on the conductor prevents the dampening member from adhering to it so that as dimensional changes take place due to temperature changes, the dampening member will not pull the conductor loose from the crystal.

Positioned rearwardly of the dampening member and in contact with the rear face 38B is a washer 40 formed of non-metallic material, such as nylon. The use of washer 40 is optional and is not mandatory in the practice of the invention. In some forms of dampening members 38, use of the non-metallic washer 40 may be desired. The washer 40 is of external diameter just slightly less than the internal diameter of cavity 28 and has an axial opening 40A which receives the conductor 36A.

Faced rearwardly of washer 40 is a flat metal washer 42 having opening 42A therein receiving conductor 36A. The diameter of the washer 42 is just slightly less than the internal diameter of cavity 28, and it is in secure engagement with the first washer 40; or if the first washer 40 is not used, it is in secure engagement with the rearward face 38B of dampening member 38.

Figure 3:
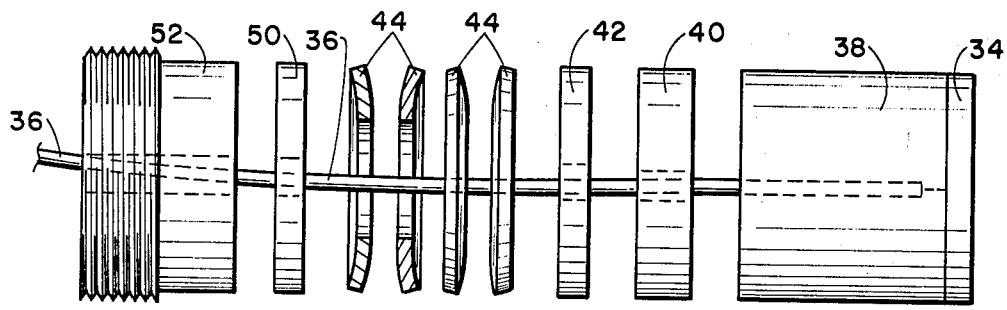
FIG. 3 is an exploded view of the internal elements of the preferred embodiment of FIG. 2, the housing not being shown.

Positioned rearwardly of washer 40 are a plurality (four being shown) of spring washers 44, each of which has a relatively large opening 44A therethrough. The spring washers 44 are of an external diameter slightly less than the internal diameter of cavity 28. The spring washers may be of two basic types: that is, the Belleville type or the wave spring type. The Belleville spring washer is, in its normal configuration, cup-shaped. The washers provide a spring function by deforming towards a flat configuration as compressive force is applied. FIG. 3 shows four of the Belleville-type washers, two in external configuration and two in cross-sectional configuration. The washers are spaced in a manner such as to provide a spring action as they are squeezed together; that is, pairs are placed back-to-back with intermediate pairs front-to-front. Putting it another way, as the washers are stacked, each succeeding washer is reversed as to its dish-shaped configuration.

Figure 4:
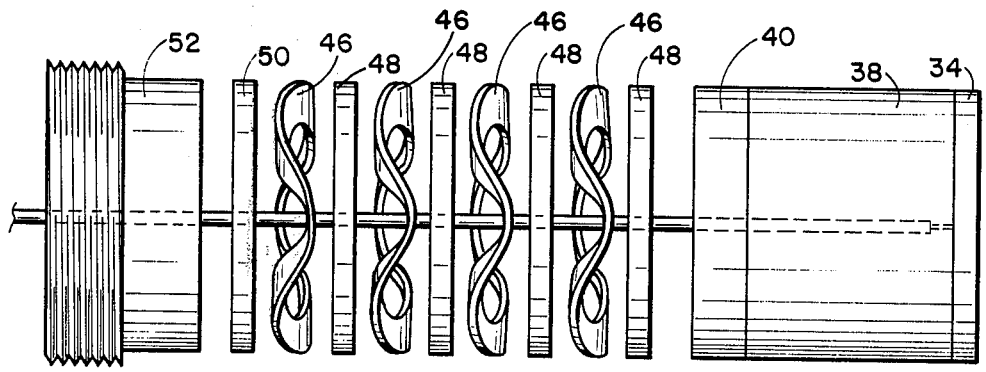
FIG. 4 is an exploded view as in FIG. 3 but showing the use of wave springs and washers to attain the resilient compressive force required in the transducer.

Another type of spring washers is shown in FIG. 4. In this embodiment the washers identified by the numeral 46 are known in industry as "wave spring" type washers. Rather than being cup-shaped as the Belleville type washers of FIG. 3, the wave spring washers have an undulating configuration around their full circumference. In order to achieve spring action, the wave spring washers must be separated by flat washers 48. In all instances the external diameter of the spring washers 46 and flat washers 48 is slightly less than the internal diameter of the cavity 28 and the washers 46 and 48 have axial openings therethrough which receive the conductor 36. When compressive force is applied against the spring washers, either the Belleville or wave spring type, the washers are caused to deform. This spring action creates a high intensity compressive force.

To complete the transducer 22 a final flat washer 50 is employed having an opening 50A therein which receives conductor 36. Washer 50 engages the rearward end of the stacked spring washers 44 or 46. The use of washer 50 is optional.

The final element in the transducer 22 is an externally threaded plug member 52. The inner face 52A engages the rearwardmost washer 50. As the plug 52 is threadably advanced into the body cavity 28, the spring washers are collapsed. This exerts a great amount of compressive force against cylindrical dampening member 38 and crystal 34. This compressive force prevents separation of the crystal and the dampening member.

The use of spring washers has many advantages in the present invention. A relatively small stack of washers is capable of applying a pressure of several hundred pounds per square inch in a comparatively small space. Normally the compressive force supplied by stack washers is equal to the maximum compressive force of a single washer. The more washers utilized, the longer is the length of adjustment which may be employed in regulating the compressive force from minimum to maximum. In the preferred arrangement the spring washers selected should provide a pressure of several hundred pounds per square inch. Tests have indicated that 600 to 1,200 lbs. per square inch of force is ideal for most applications.

Crystal 34, dampening member 38, and first washer 40, if employed, are all configured to be slightly less in external diameter than the internal diameter of the cavity 28. In this way, any cold flow of these elements which takes place as compressive force is applied will be limited and confined by the interior dimensions of cavity 28. This prevents distortion of the members which might, under other circumstances, destroy their effectiveness.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A dampened ultrasonic transducer for imparting sonic energy to or receiving sonic energy from fluid comprising:
    a housing having a cylindrical cavity therein providing a closed end wall at one end and an opening in the opposite end, the housing having internal threads adjacent the open end;
    a piezoelectric crystal of cylindrical dimension slightly less than the diameter of said housing cavity and of short axial length, having front and rear faces, the crystal being positioned within said housing cavity with the front face thereof contiguous to said housing closed end wall;
    a cylindrical dampening member of external dimension slightly less than the diameter of said housing cavity and having a front and rear face and having an axial opening therethrough, the dampening member being positioned within said cavity with the front face thereof contiguous to said crystal rear face;
    a plurality of cylindrical spring washers each of diameter slightly less than the diameter of said housing cavity and each having an axial opening therethrough, the forwardmost washer arranged to apply force against the rear face of said dampening member;
    an externally threaded cylindrical plug member positioned in said housing threaded open end and having an axial opening therethrough, the plug member being threadably advanced to apply selectable force against said plurality of spring washers which, in turn, apply such selectable compressive resilient force against said dampening member to thereby maintain a selectable force of contact of said dampening member with said crystal and said crystal with said housing closed end wall; and
    a conductor received in the aligned axial openings in said dampening member, said spring washers, and said plug member and being electrically secured to said crystal rear face, whereby the conductor extends externally of said housing.

2. A dampened ultrasonic transducer according to claim 1 wherein said spring washers are of the Belleville type.

3. A dampened ultrasonic transducer according to claim 1 wherein said spring washers are of the wave spring type and including flat washers between adjacent wave spring washers.

4. A dampened ultrasonic transducer according to claim 1 wherein said crystal rear face is bonded to said dampening member front face.

5. A dampened ultrasonic transducer according to claim 1 including:
    a flat washer of diameter slightly less than the diameter of said housing cavity and positioned between said spring washers and said dampening member rear face.

* * * * *